United States Patent [19]

Lindstrom

[11] Patent Number: 5,528,850
[45] Date of Patent: Jun. 25, 1996

[54] FISHING TACKLE WEAK POINT

[76] Inventor: William H. Lindstrom, 951 Turner Rd. #1713, Grapevine, Tex. 76051

[21] Appl. No.: 382,916

[22] Filed: Feb. 3, 1995

[51] Int. Cl.⁶ ..................................... A01K 83/00
[52] U.S. Cl. .............. 43/4.5; 43/43.16; 43/44.82
[58] Field of Search .............. 43/43.16, 44.82, 43/43.12, 44.83, 42.53, 4.5; 29/9

[56] References Cited

U.S. PATENT DOCUMENTS

| | | | |
|---|---|---|---|
| 911,040 | 2/1909 | Hickey | 43/44.8 |
| 2,533,418 | 12/1950 | Benoit | 43/44.83 |
| 2,734,302 | 2/1956 | Wright, Jr. | 43/42.38 |
| 4,471,556 | 9/1984 | Dworski | 43/42.48 X |
| 4,715,142 | 12/1987 | Richard | 43/43.16 |
| 4,750,291 | 6/1988 | Chilton | 43/44.82 |
| 4,809,457 | 3/1989 | Macachor | 43/43.12 |
| 4,825,583 | 5/1989 | Kammeraad | 43/43.12 |
| 4,837,968 | 6/1989 | Lin | 43/43.12 |
| 5,113,616 | 5/1992 | McManus | 43/43.16 X |

*Primary Examiner*—J. Elpel
*Attorney, Agent, or Firm*—James E. Bradley

[57] ABSTRACT

A fishing lure has a weak point so as to avoid losing the body of the lure if the hook of the lure snags a large submerged object. The weak point is in the shank of the hook, and it is provided with a parting strength that is less than the tensile strength of the line. Pulling hard on the line if a snag occurs causes the weak point to shear, allowing retrieval of the body of the lure. The weak point is a neck section surrounded by a groove, having a diameter less than the diameter of the remaining portions of the shank. The weak point is formed by a crimping tool which deforms the shank of the hook.

2 Claims, 1 Drawing Sheet

FISHING TACKLE WEAK POINT

BACKGROUND OF THE INVENTION

1. Field of the Invention

This invention relates in general to fishing tackle, and in particular to fishing tackle that will allow retrieval of a lure in the event of a snag.

2. Description of the Prior Art

One type of fishing tackle utilizes a fishing lure. The fishing lure has a body which differs widely in configuration and color. The body has an eyelet on the forward end for connecting to the fishing line. The body will also have one or more eyelets for connecting hooks. Typically, the user casts the lure and then slowly retrieves it.

Lures, particularly lures that move below the water rather than on the surface, are prone to snagging. If a lure catches on a large rock, submerged log or other large submerged object, it is difficult to retrieve it. Often the user is unable to free the hook from the submerged object and must break the line. This results in the lure being lost.

SUMMARY OF THE INVENTION

In this invention, a weak point is provided for the fishing tackle. The weak point is located in the shank of the hook. It is configured so that it will part, separating a forward portion of the shank from the hook at a selected tensile strength. This tensile strength is selected to be less than the tensile strength of the line. If the hook snags, the user can pull hard enough to cause the shank to part from the hook without breaking the line. This allows retrieval of the body of the lure. The user can then re-attach a hook to the lure body.

In the preferred embodiment, the weak point is formed by crimping the shank. This creates a groove in the shank defining a neck with reduced diameter. The neck has a smaller diameter than the rest of the shank and will part at the desired tensile strength.

Preferably, the crimping can be employed by the user with a crimping tool. The crimping tool may have a number of different sizes of crimping edges to allow a selected tensile to be provided, regardless of the diameter of the shank.

DETAILED DESCRIPTION OF THE INVENTION

Figure 1:
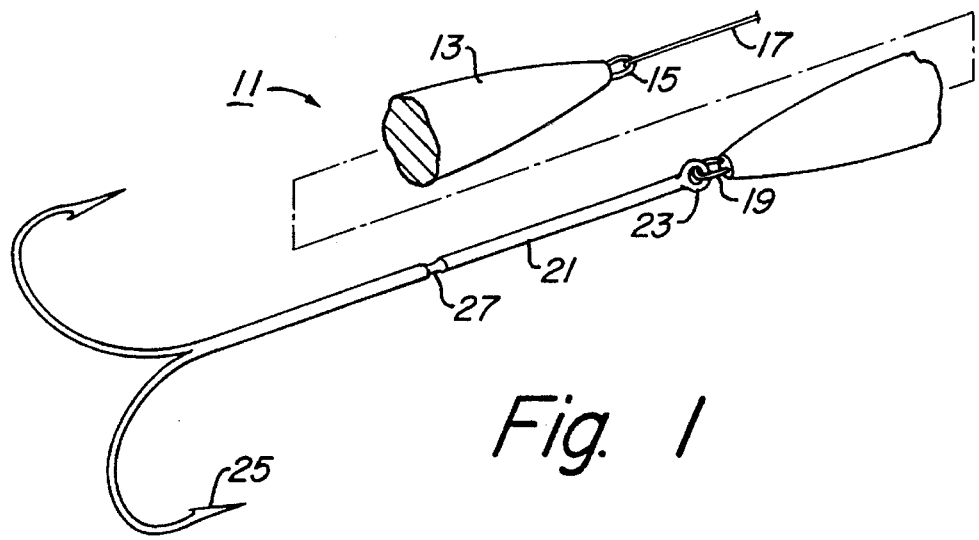
FIG. 1 is a perspective view showing a portion of a lure constructed in accordance with this invention.

Referring to FIG. 1, fishing lure 11 has a body 13 which is shown schematically. Body 13 may be of a variety of sizes, shapes, materials and colors. Body 13 has a front eyelet 15 on the forward end. The user ties a fishing line 17 to eyelet 15. Fishing line 17 is typically a monofilament Nylon line. Body 13 also has one or more hook eyelets 19 located rearward of line eyelet 15. Hook eyelets 19 may be at the rearward end of body 13, or between the rearward and forward ends of body 13.

A shank 21 attaches to hook eyelet 19. Shank 21 is a straight rigid, metal wire. Shank 21 has a loop 23 on its forward end that extends through eyelet 19 and is closed to secure shank 21 to eyelet 19. Shank 21 is integrally formed with one or more hooks 25 (two shown). Shank 21 and hook 25 are preferably of stainless steel.

Figure 3:
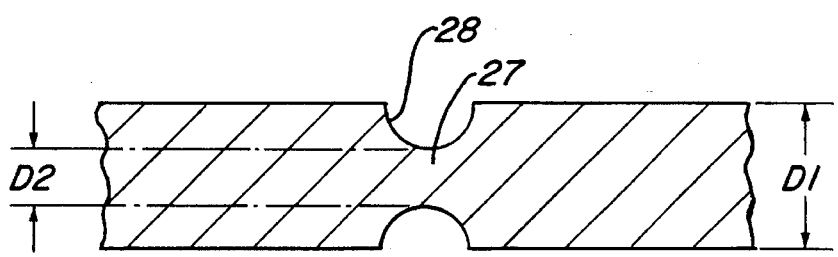
FIG. 3 is an enlarged sectional view of the weak point area of the lure of FIG. 1.

A weak point 27 is located in shank 21 to provide a point for shank 21 to part in the event of a snag. Weak point 27, as shown in FIG. 3, is a neck section defined by an annular groove 28 and having a reduced diameter. The numeral D1 indicates the diameter of shank 21. The numeral D2 indicates the diameter of weak point 27. Diameter D2 is selected to provide a cross-sectional area that is circular and sufficiently small so as to part at a tensile force less than the tensile force to part line 17. Groove 28, which defines weak point 27 has a uniform depth and curved sidewalls.

Figure 2:
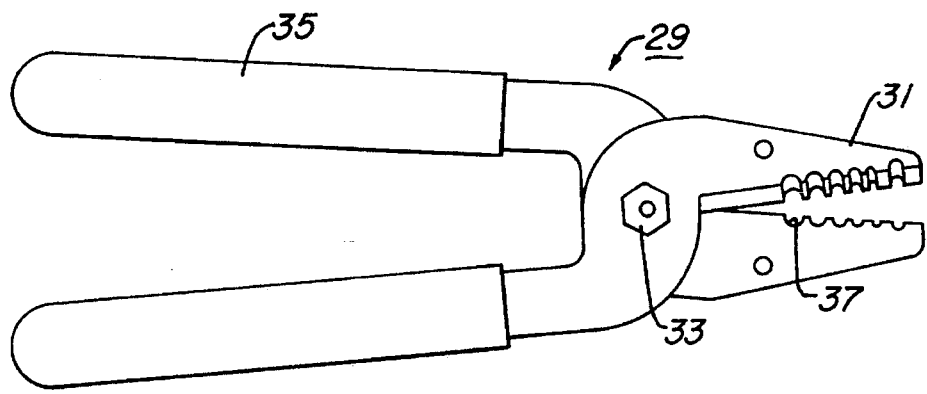
FIG. 2 is a side elevational view of a crimping tool for use in forming a weak point for the lure of FIG. 1.

FIG. 2 illustrates a crimping tool 29 which can be used to form weak point 27. Crimping tool 29 has a pair of jaws 31 which move between open and closed positions. Jaws 31 are secured pivotally to each other by a fastener 33. A handle 35 extends rearward from each jaw 31. Squeezing handles 35 toward each other causes jaws 31 to move to the closed position.

Each of the jaws 31 has a plurality of crimping edges 37. Each crimping edge 37 is a semi-circular edge. When moved to the fully closed position, the mating crimping edges 37 will result in an aperture of a selected diameter. Crimping edges 37 will not fully close to completely cut an object in two pieces, rather in the fully closed position, will provide apertures between the mating edges 37. Crimping tool 29 is similar to a conventional wire stripping tool, except that the crimping edges 37 will be of harder material and different dimensions so as to be capable of deforming stainless steel. Preferably, there are a number of crimping edges 37 (six shown), each having a different diameter. This allows the user to select the desired tensile strength for shank 21, independently of the actual diameter of shank 21.

In operation, the user will select a crimping edge to provide the desired tensile strength. The user will select a line 17 that has a tensile strength somewhat greater than the desired tensile strength of shank 21. The user places the two jaws 31 around shank 21 and squeezes handles 35 together. The edges 37 of jaws 31 will deform the shank 21, forming groove 28, and providing a weak point 27 of reduced diameter.

While using lure 11, if the hook 25 snags on a submerged object such as a log or rock, the user can free the lure body 13 by pulling on line 17. This results in shank 21 parting at weak point 27. Hook 25 will remain lodged on the submerged object. The user may then remove shank 21 by opening loop 23 and attaching to eyelet 19 a new shank 21 having a hook 25. The new shank 21 may also be provided with a weak point 27 as described above.

In the event of a large fish having a weight greater than the tensile strength of line 17 taking the lure 11, the user will use conventional methods of reducing drag on his reel (not shown) and tiring the fish before retrieving the fish with a gaff or net. In this manner, the user will be able to catch a fish having a weight greater than the tensile strength of weak point 27.

The invention has significant advantages. The weak point allows the user to retrieve a lure body, saving the expense of a replacement lure. It also avoids the lure body remaining in the water. The weak point can be formed by manufacturer of the lure. Alternately, the weak point can be formed by the user with the crimping tool. Different tensile strengths can be readily provided regardless of the diameter of the hook shank.

While the invention has been shown in only one of its forms, it should be apparent to those skilled in the art that it is not so limited but is susceptible to various changes without departing from the scope of the invention.

I claim:

1. A method of fishing to avoid losing a body of a fishing lure due to a snag, the fishing lure having a hook with a shank attached to the body, the method comprising:

(a) attaching the body to a line having a selected tensile strength;

(b) providing the shank with a weak point which has a tensile strength that is less than the tensile strength of the line; then, in the event of a snag, (c) pulling on the line at a level sufficient to cause the weak point to part, then retrieving the line and the body while leaving the hook in its snagged condition; and wherein step (b) comprises:

providing a crimping tool which has a pair of jaws pivotally mounted together for movement between open and closed positions, each of the jaws having at least one semi-circular crimping edge which mates with an identical crimping edge on the other jaw to provide a circular aperture of selected diameter when the jaws are in the closed position; and placing the jaws around the shank and moving them to the closed position, crimping a portion of the shank to provide an annular groove defining a neck which has a diameter that is selected to result in a tensile strength less than the tensile strength to the line.

2. A method of fishing to avoid losing a body of a fishing lure due to a snag, the fishing lure having a hook with a shank attached to the body, the method comprising:

(a) attaching the body to a line having a selected tensile strength;

(b) providing the shank with a weak point which has a tensile strength that is less than the tensile strength of the line; then, in the event of a snag, (c) pulling on the line at a level sufficient to cause the weak point to part, then retrieving the line and the body while leaving the hook in its snagged condition; and wherein step (b) comprises:

providing a crimping tool which has a pair of jaws pivotally mounted together for movement between open and closed positions, each of the jaws having at least one semi-circular crimping edge which mates with an identical crimping edge on the other jaw to provide a circular aperture of selected diameter when the jaws are in the closed position; and placing the jaws around the shank and moving them to the closed position, crimping a portion of the shank to provide an annular groove defining a neck which has a diameter that is selected to result in a tensile strength less than the tensile strength to the line; and wherein the step of providing a tool further comprises:

providing each of the jaws with a plurality of the crimping edges having different diameters from each other, so as to select the desired diameter and shear strength of the weak point.

* * * * *